(12) United States Patent
Wanner et al.

(10) Patent No.: US 7,743,594 B1
(45) Date of Patent: Jun. 29, 2010

(54) MECHANISM FOR GUIDING A WINDROWER FOR MAKING AN INITIAL CUT FOR MULTIPLE WINDROWS

(75) Inventors: John E. Wanner, Denver, PA (US); D. Russell Whitenight, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/371,951

(22) Filed: Feb. 17, 2009

(51) Int. Cl.
*A01D 43/00* (2006.01)
*A01D 57/00* (2006.01)

(52) U.S. Cl. .................. 56/192; 172/430; 172/132

(58) Field of Classification Search ............... 56/192; 172/430, 132, 126, 131, 311, 127, 834; 33/264, 33/624, 392, 613; 116/28 R, 303
See application file for complete search history.

(56) References Cited

U.S. PATENT DOCUMENTS

| 2,143,997 | A |   | 1/1939 | Parkinson |
| 2,483,011 | A |   | 9/1949 | Hudson |
| 2,827,704 | A |   | 3/1958 | Hunsicker |
| 3,002,573 | A |   | 10/1961 | Immesoete |
| 3,028,678 | A |   | 4/1962 | Bakehouse |
| 3,611,286 | A |   | 10/1971 | Cleveland |
| 3,932,028 | A |   | 1/1976 | Klinger |
| 4,049,062 | A | * | 9/1977 | Rossmiller et al. ............ 172/126 |
| 4,331,206 | A |   | 5/1982 | Linton |
| 4,393,596 | A |   | 7/1983 | Gerber |
| 4,734,683 | A | * | 3/1988 | Howell et al. ................ 340/684 |
| 5,027,525 | A | * | 7/1991 | Haukaas ....................... 33/624 |
| 5,146,686 | A |   | 9/1992 | Brown |
| 5,425,427 | A | * | 6/1995 | Haugen ....................... 172/126 |
| 5,579,716 | A |   | 12/1996 | Groff |
| 6,079,114 | A | * | 6/2000 | Toews .......................... 33/624 |
| 6,883,299 | B1 | * | 4/2005 | Gramm .................... 56/10.2 E |
| 7,028,459 | B2 |   | 4/2006 | Lohrentz et al. |

\* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A mechanism for guiding a windrower while making an initial swath pass in a multi-pass windrow merging operation in a manner to establish the lateral spacing between an end of the header and the adjacent edge of the uncut crop so that the header encounters an optimal width of standing crop in a subsequent swath pass. The mechanism is selectively positionable between deployed (working) and stowed positions to maintain machine maneuverability when not in use. The mechanism further incorporates provisions to prevent damage to the mechanism resulting from inadvertent encounters with obstacles.

16 Claims, 4 Drawing Sheets

MECHANISM FOR GUIDING A WINDROWER FOR MAKING AN INITIAL CUT FOR MULTIPLE WINDROWS

BACKGROUND OF THE INVENTION

The present invention relates to agricultural windrowers and, more particularly, to a mechanism for guiding a windrower through a field while making an initial cut in order to create merged windrows.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Current practice in agriculture is to cut a relatively wide swath of the crop within a range of anywhere between 10 and 19 or more feet in width, and then consolidate the crop into a narrower, substantially continuous windrow, in which form the crop is left to dry in the field until the moisture content has been reduced to a value suitable for subsequent harvesting operations, such as baling or chopping.

More current practice is to combine multiple windrows together as they are being mowed. This practice eliminates a raking operation and also reduces the number of passes of subsequent harvesting operations (e.g., chopping and baling). With the advent of higher capacity forage harvesters and balers, merging windrows has become more desirable than increasing windrower header widths as a means to keep pace with the higher capacity machines used in subsequent harvesting operations. Windrow merging attachments are thus becoming more prevalent on windrowing machines.

Merging two windrows requires the windrower to make an initial pass through a field and then make a second pass adjacent to the first pass but in the opposite direction. Often two passes do not provide sufficient crop material in the merged windrow to satisfy the capacities of larger forage harvesters and balers; therefore, merging the windrows of three or four windrowing passes may be desired. Merging three windrows requires making an initial pass through a field while leaving areas of uncut crop on both sides of the windrower. During the initial pass, the merger apparatus is positioned to allow the windrow to fall directly behind the windrower. Subsequent additional passes, one on each side of the initial pass, are then performed with the merger apparatus directing the windrow toward the centrally located initial windrow. For even larger windrows, it may be desirable to merge four windrows together. This is performed in a manner that similarly requires an initial pass through the field with uncut crop on both sides of the windrower. An initial pass and a subsequent adjacent pass are performed while limiting the merger apparatus discharge distance so that a merged windrow is formed along the boundary of the first two passes. Two additional passes are them performed, one on either side of the double swath formed by the first two passes, with the merger discharge apparatus configured for a greater discharge distance and the windrows directed to the centrally positioned merged windrow from the first two passes. A problem arises in guiding the windrower on the initial pass through the uncut crop so that the distance from the header end to the edge of the previously uncut crop is consistently equal to the cutting width of the header. If the initial pass is too close to the edge of the uncut crop, the subsequent second pass will not fully utilize the windrower capacity. If the initial pass is too far from the edge of the uncut crop, the uncut crop for the subsequent second pass will be too wide and result in standing crop left in the field. GPS systems have been recently employed to aid in initial swath path guidance. However, these systems require a significant investment and are not economical for all customers.

It would be a great advantage to provide a simple mechanism to assist an operator in guiding a windrower while making an initial pass of a multiple-pass windrow merging operation such that subsequent passes would encounter optimal widths of standing crop thereby overcoming the above problems and disadvantages.

SUMMARY OF THE INVENTION

Accordingly, it is an object of the present invention to provide a mechanism for guiding a windrower during an initial pass of multiple-pass windrow merging operations in a manner that optimizes lateral displacement of the windrower in the standing crop.

It is a further object of the present invention to provide a mechanism for guiding a windrower through a field of standing crop on an initial pass of a multi-pass windrow merging operation that is easily attachable to the windrower with minimal modification.

It is a further object of the present invention to provide a guide mechanism for guiding a windrower through a field of standing crop on an initial pass of a multi-pass windrow merging operation that is easily adaptable for use on either side of the windrower header.

It is a further object of the present invention to provide a mechanism for guiding a windrower through a field of standing crop on an initial pass of a multi-pass windrow merging operation that is movable between a working position and a stowed position.

It is a still further object of the present invention to provide a mechanism for guiding a windrower through a field of standing crop on an initial pass of a multi-pass windrow merging operation that when in a stowed position does not further extends the bounds of the header thereby maintaining windrower maneuverability and maximum road transport width.

It is a still further object of the present invention to provide a mechanism for guiding a windrower through a field of standing crop on an initial pass of a multi-pass windrow merging operation that is durable in construction, inexpensive of manufacture, carefree of maintenance, easily assembled, and simple and effective to use.

These and other objects are achieved by providing a mechanism for guiding a windrower while making an initial swath pass in a multi-pass windrow merging operation in a manner to establish the lateral spacing between an end of the header and the adjacent edge of the uncut crop so that the header encounters an optimal width of standing crop in a subsequent swath pass. The mechanism is selectively positionable between deployed (working) and stowed positions to maintain machine maneuverability when not in use. The mechanism further incorporates provisions to prevent damage to the mechanism resulting from inadvertent encounters with obstacles.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
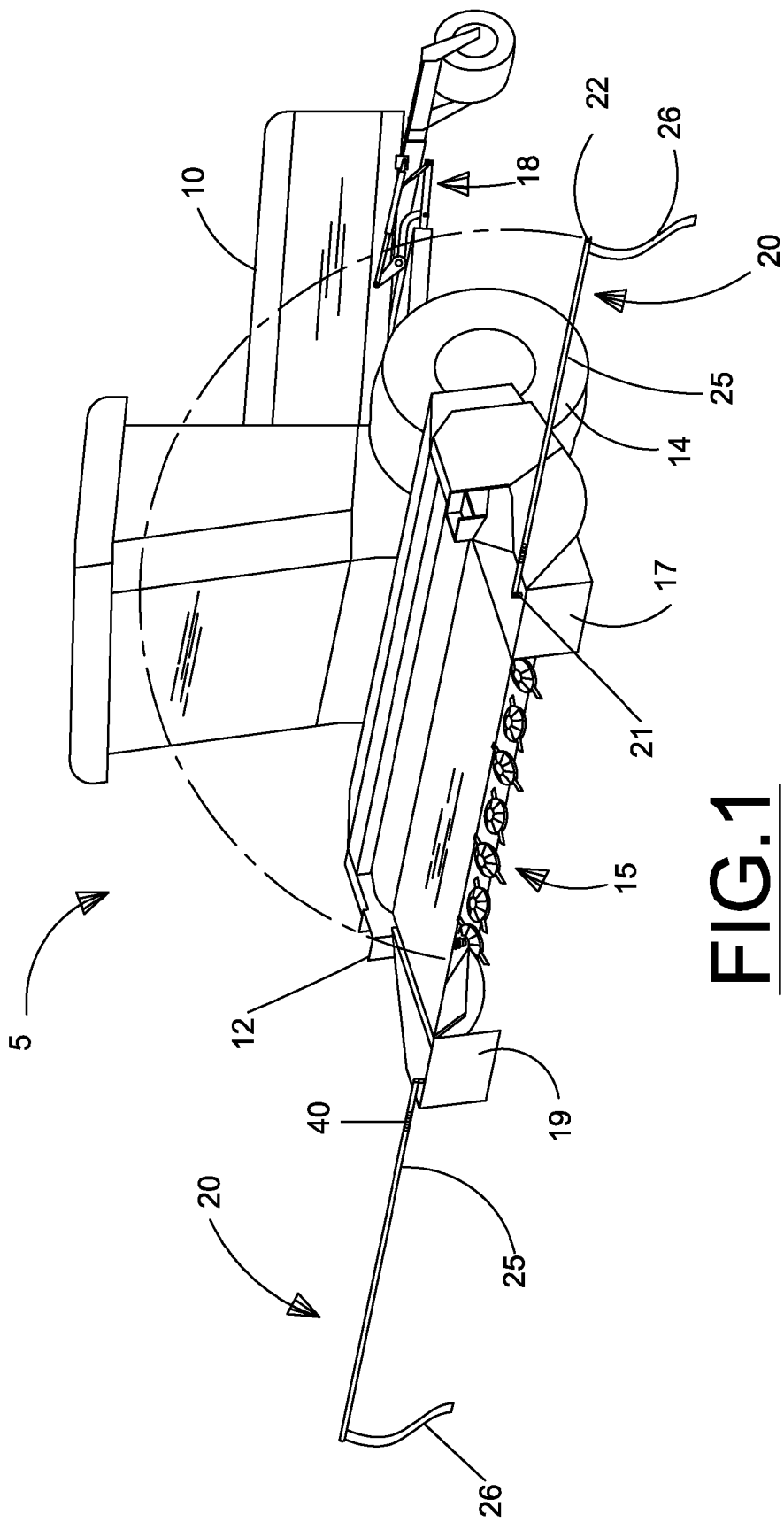
FIG. 1 is a forward perspective view of a typical self-propelled agricultural windrower of the type on which the present invention is useful showing a first embodiment of the present invention.

FIG. 1 shows a forward perspective view of a typical self-propelled windrower 5 used for harvesting a crop material as it travels across the ground. Usually, a tractor 10 pushes a header 12 which severs the crop material from the ground, usually by a sickle-bar, rotary cutter or other functionally equivalent cutting means 15 disposed along a leading edge of the header. The cutting means 15 extends transversely across substantially the width of the header 12, extending between opposing side walls 17, 19, thereby establishing a cutting width for the header 12. The cut crop material is urged toward the center of the header where it may be conditioned prior to discharge from the header. The crop is then ejected rearwardly from the header 12, generally in the space between the drive wheels 14 whereupon it falls to the ground. Shields (not shown) are used to arrange the crop into a windrow that is formed generally along the longitudinal axis of the windrower.

A merger apparatus 18 may also be provided for laterally directing conditioned crop toward a side of the windrower for combination with adjacent windrows of crop from a previous separate pass by the windrower. Merging is typically performed using a sequential series of passes, each successive pass in a direction opposite to the previous pass. One representative merger apparatus is disclosed in common assignee's pending application Ser. No. 11/949,967, the entirety of which is incorporated herein by reference.

FIG. 1 also shows header 12 including one embodiment of the present invention having at least one guide mechanism 20 comprising a movable guide arm 25 which is movably connected to header 12. Guide arm 25 is an elongate structure further comprising a movable connector end 21 at one end and an opposing guide end 22. Connector end 21 is movably connected to header 12 in a manner allowing the guide arm 25 to be selectively positioned in a deployed position (shown in FIG. 1) and a stowed position (shown in FIG. 2). In the deployed position, guide arm 25 extends laterally away from the header for a distance generally equal to the cutting width of the header. An observable marker 26 is connected to guide end 22 and extends generally vertically downward from the guide end 22. Marker 26 establishes a point of reference that enables a windrower operator to easily guide the windrower along a first swath path that is one swath-width from the edge of the standing crop so that the standing crop along a subsequent second swath path positioned between the edge of the standing crop and the nearest edge of the first swath path has a width generally equal to the cutting width of the header. Marker 26 may be formed from a rigid, semi-rigid, or a flexible material.

Figure 2:
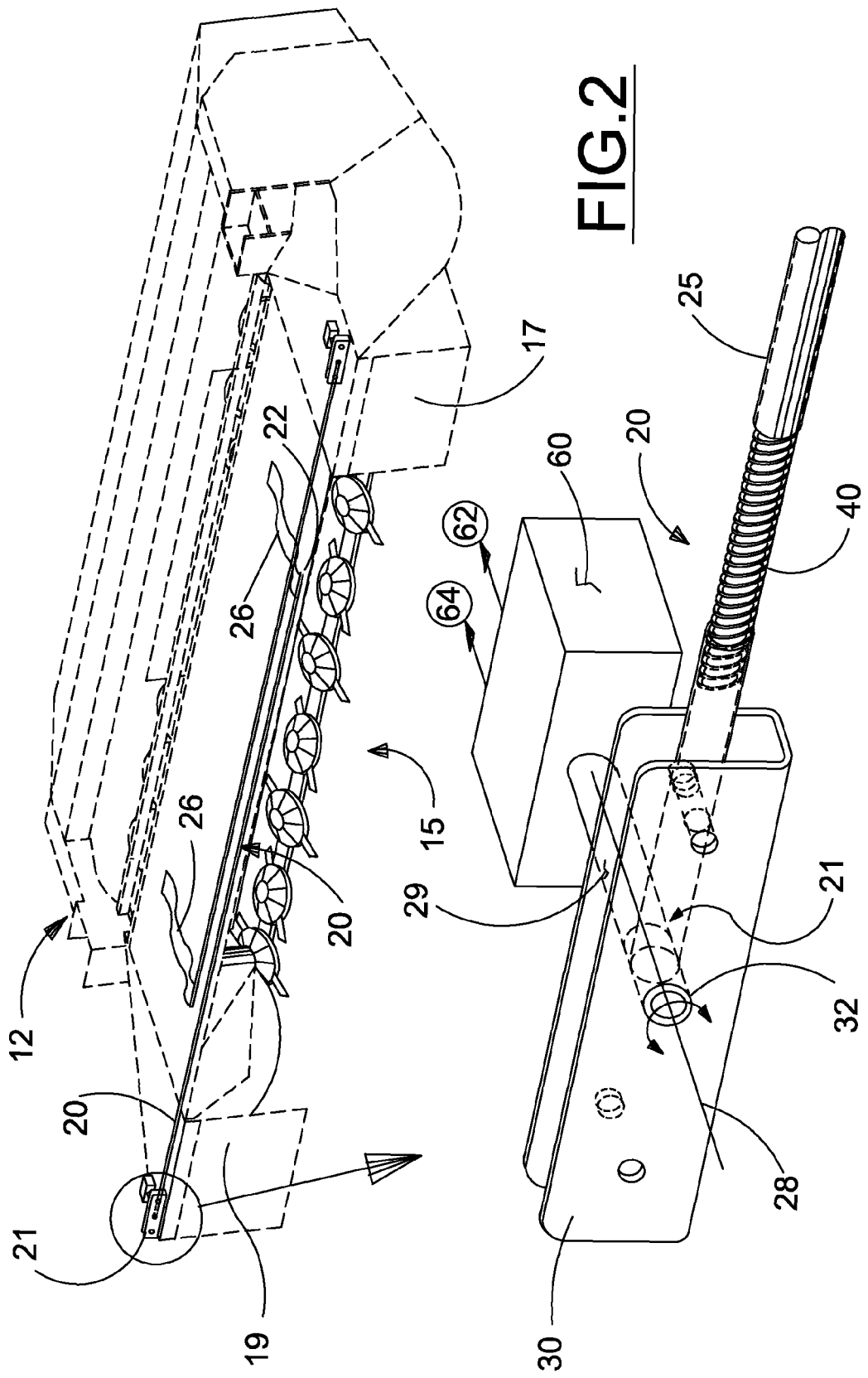
FIG. 2 is an enlarged perspective view of the header of the windrower of FIG. 1 showing one embodiment of the present invention.

Now referring to FIG. 2 in conjunction with FIG. 1 wherein one embodiment of the present invention is depicted in detail, header 12 includes a mounting bracket 30 for receiving guide arm 25 in a manner allowing pivotal movement of guide arm 25 about an axis 28. The connector end 21 of guide arm 25 includes a pivot end connector 29 which engages axial openings 32 in bracket 30 to provide the pivot connection between the guide arm 25 and bracket 30. One skilled in the art will recognize that there are numerous means to provide such a connection between guide arm 25 and bracket 30. Functionally equivalent pivotal connecting means are contemplated within the scope of this invention. In the embodiment shown, guide arm 25 pivots in a generally vertical plane as it is moved between the stowed and deployed positions; however, as one skilled in the art will recognize, the orientation of the pivot connection 32 may be altered while preserving the functional objective of the guide arm deployment without deviating from the intent of the invention.

Guide mechanism 20 may also include an actuator 60 to pivot the guide arm 25 between stowed and deployed positions. In order to minimize the risk of damaging the guide arm 25, operation in the deployed position is recommended only during the initial swath pass. At the completion of the initial pass, rather than requiring an operator to exit the cab to stow the guide mechanism, a powered actuator, remotely controlled from within the cab allows an operator to easily reposition the guide mechanism to the stowed position once the initial pass is completed. When the windrow merging cycle is completed, a remotely actuated mechanism also allows the guide arm to be easily deployed. Actuator 60 may be hydraulically or electrically actuated as either motive power is readily available on a conventional windrower. Actuator 60 may act directly on a torque-resistant connection to pivot end connector 29, through a linkage, or by any number of well-known means to produce the desired pivotal movement of the guide arm 25. One or more position sensors 62 and a remote switch 64 may also be provide to automate the repositioning of the guide mechanism 20 and further enhance operator convenience. Such controls are well known and easily adaptable to the present invention.

Guide arm 25 is constructed of a sufficiently rigid material to enable it to remain self-supporting while cantilevered from connector end 21 as the windrower propels the header across uneven ground surfaces typical of many fields. Guide arm 25 must also be sufficiently strong to withstand unintentional contact with immovable objects or other objects that may be encountered in the field that cause the arm to be deflected. The length of guide arm 25 is sufficient to position marker 26 a distance approximately equal to the cutting width of the header, typically 10 to 19 feet. Metallic and non-metallic materials are contemplated.

Guide mechanism 20 also includes a break-away device 40 which prevents the guide arm from being damaged from accidental contact with immovable objects while the windrower is being operated. Break-away device 40 allows the guide arm 25 to be deflected when it contacts an immovable object rather than risk damage from the contact. Once the guide arm clears the object, break-away device 40 may return the guide arm to its deployed position. In one embodiment, break-away device 40 is a close-wound extension spring integrated into guide arm 25 adjacent to the connector end 21 thereby providing a flexible connection between connection end and the extended portion of the guide arm. Those skilled in the art may devise other methods of accomplishing the same function; such methods are considered within the scope of the present invention.

Guide mechanism 20 may also include provisions for telescopic length adjustment of the guide arm 25. Such an adjustment feature enables a single guide mechanism to be produced for use on a variety of header widths and eliminates the need to produce and stock multiple mechanisms having various length guide arms. Alternatively, a plurality of connections adjacent to the remote second end may be provided to allow marker 26 to be positioned in one of a plurality of locations thus allowing the offset width to be easily adjusted by the operator to suit field conditions.

Figure 3:
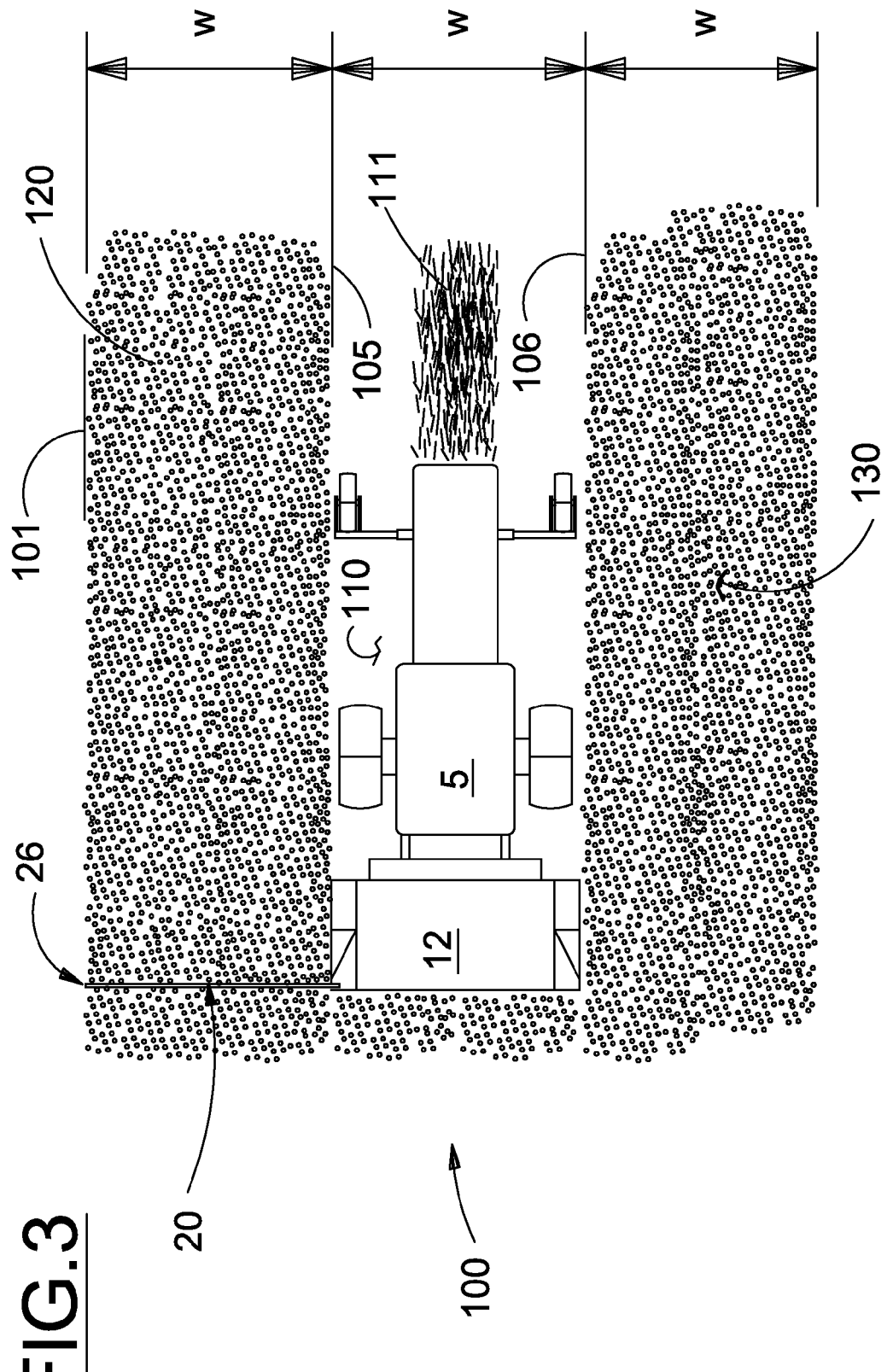
FIG. 3 presents a first view of a method of using the present invention in which the windrower is making an initial pass through a standing crop using the present invention.
Figure 4:
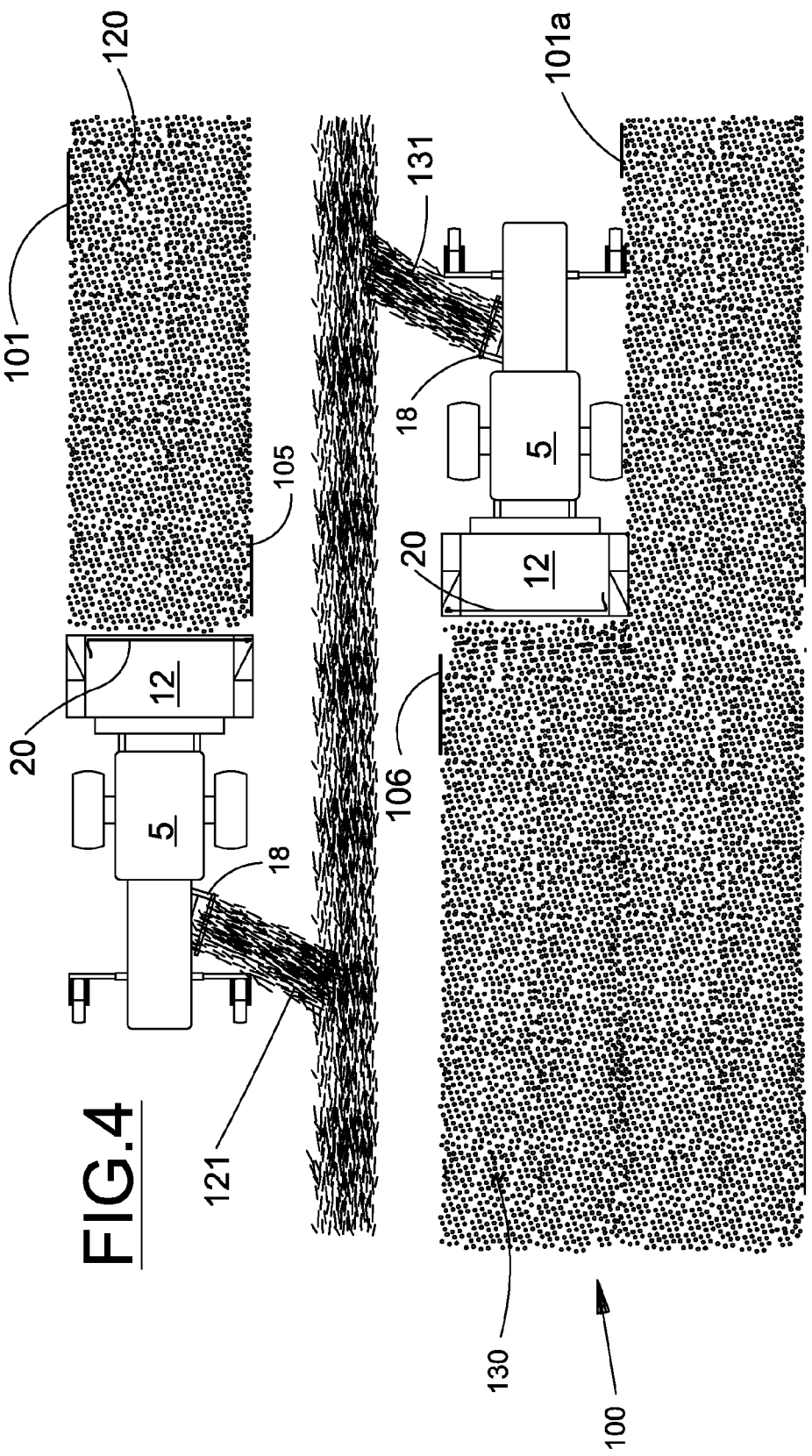
FIG. 4 presents a second view of a method of using the present invention in which the windrower is shown making a second and a third pass through a standing crop using a merger apparatus to combine multiple windrows.

Now referring to FIGS. 3 and 4, multiple windrow merging operations using the guide mechanism 20 are presented. It is to be noted that the presentation is based on an embodiment having a guide mechanism extending laterally away from one side of the header and used to establish a width of standing, uncut crop adjacent to an initial swath and maintain that established width at the cutting width for the header for the entire length of the first swath. Guide mechanism 20 can be positioned on either side of the header or a mechanism can be provided on both sides of the header for maximum operational flexibility. In FIG. 3, windrower 5 having a header with a cutting width "W" is shown making a first swath 110 through a standing crop 100 and creating first windrow 111. The standing crop has a first edge 101, such as a perimeter edge or a cut edge from an earlier swath. The standing crop extends for an undefined distance along the direction of travel and is ideally bounded at the ends by headlands to enable space for equipment, such as the windrower 5, to turn around and reverse the direction of travel. The first swath 110, created as the windrower passes through the crop, is bounded by right and left cut edges 105, 106. The operator guides the windrower 5 so that marker 26 on guide mechanism 20 tracks along first edge 101 thereby leaving an area of standing crop having an approximate width "W" standing for a second swath 120. Severed crop material is typically directed rearwardly from the windrower during the first swath so that the first windrow 111 is generally centered in the first swath.

Upon reaching the end of the first swath 110, the windrower direction is reversed, the merger apparatus 18 is engaged to laterally displace the severed crop, and the operator guides the windrower along second swath 120, cutting the crop left standing between the first swath 110 and the first edge 101 as shown in FIG. 4. Second windrow 121 is created and directed by the merger 18 onto the first windrow 111. By using guide mechanism 20 to guide the windrower along the first swath, the width of the standing crop for the second swath is generally the same as the cutting width of the header thereby maximizing cutting efficiency on the second swath.

Also shown in FIG. 4, is a third swath 130 in which a third windrow 131 may also being merged with first and second windrows 111, 121. At the completion of three swaths as shown, a new first edge 101a exists and the process begins anew with the resultant windrow being discharged directly behind the windrower.

Some merging operations, such as merging of two or four swaths into a single windrow might use a merger capable of varying the lateral crop displacement. In such instances, the merger would be engaged for all swaths. Merging operations for two windrows are conveniently arranged with a merger apparatus capable of directing the windrow to a position adjacent to the cut edge of the standing crop. Merging operation for four swaths require a merger apparatus capable of varying the lateral discharge distance; the lateral discharge distance would be increased following the first two passes and would result in a windrow generally positioned along the centerline of the first two passes. Referring to FIG. 4, the direction of travel for the initial swath would need to be reversed from that shown and a guide mechanism 20 would need to be provided on the opposite side of the header 12. An initial swath 110 would be made while directing the windrow adjacent to the right-side cut edge and using the guide mechanism to retain a subsequent swath 120 of standing crop on the left side of the machine. The second swath would be along the area of standing crop immediately adjacent to the first windrow, shown as swath 130 in FIG. 4. The third and fourth swaths would employ a longer discharge feature of the merger apparatus, capable of directing the windrow substantially across a full swath width. The third swath would then cut the area of standing crop left after the initial swath pass (shown as second swath 120) and direct the windrow to the centrally positioned merged windrow of the first two passes. A fourth pass would direct the fourth windrow across the width of the second swath toward the centrally located windrow resulting in four merged windrows.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for guiding an agricultural windrower through a field of standing crop, the windrower having tractor for propelling the windrower across a field, a forwardly disposed header for severing a standing crop from a field and depositing the severed crop on the ground in a windrow, and a merger apparatus for selectively directing the location the severed crop is depositing on the ground, said mechanism comprising:

the windrower header having generally opposing first and second side walls and a cutter mechanism disposed therebetween, said cutter mechanism having a cutting width bounded by opposing first and second cutting edges;

a first elongate guide arm having a first end connected to said header and a generally opposing remote second end;

a bracket for connecting said first end to said header adjacent to said first side wall, said bracket configured to allow movement of said first guide arm between a stowed position and a deployed position, said first guide arm disposed between said first and second side walls when in said stowed position and extending laterally away from said first side wall and said header when in said deployed position; and an observable marker connected to said second end, said marker being displaced from said first cutting edge a distance generally equal to said cutting width when said first guide arm is in said deployed position, wherein the distance between the observable marker and first cutting edge forms the width of a path of a subsequent swath adjacent to a present swath path of the header.

2. The mechanism of claim 1, wherein said first guide arm is pivotally connected to said bracket and said first guide arm pivots between said stowed and said deployed positions.

3. The mechanism of claim 2, further comprising a break-away device connected to said first guide arm, said break-away device configured to allow said second end of said first guide arm to be deflected from said deployed position without damaging said first guide arm.

4. The mechanism of claim 3, wherein said break-away device is an extension spring.

5. The mechanism of claim 3, wherein said bracket further comprises an actuator to selectively move said first guide arm between said deployed position and said stowed position.

6. The mechanism of claim 5, further comprising at least one input switch for causing said actuator to move said first guide arm between said deployed and said stowed positions.

7. The mechanism of claim 6, further comprising at least one sensor for sensing the position of said guide arm.

8. The mechanism of claim 3, further comprising a second guide arm, a second bracket, and a second marker connected to said header for extension away from said second side wall and said header when in said deployed position.

9. The mechanism of claim 1, wherein said first guide arm further comprises an adjuster mechanism for selectively altering the lateral spacing between said first side wall and said marker.

10. A method for guiding an agricultural windrower along an first swath through a field of standing crop using a multiple windrow merging operation comprising the steps:
providing a windrower with a forwardly disposed header for severing a standing crop from a field and depositing the severed crop on the ground in a windrow, the header having generally opposing first and second side walls and a cutter mechanism disposed therebetween, the cutter mechanism having a cutting width bounded by opposing first and second cutting edges;
providing a merger apparatus for selectively directing the severed crop to a laterally displaced location on the ground;
providing a first guide arm mechanism comprising an elongate guide arm having a first end for connection to the header and a generally opposing remote second end;
providing a bracket for connecting the first end to the header adjacent to the first side wall, the bracket configured to allow movement of the first guide arm between a stowed position and a deployed position, the first guide arm disposed between the first and second side walls when in the stowed position and extending laterally away from the first side wall and the header when in the deployed position;
providing an observable marker connected to the second end, the marker being displaced from the first cutting edge a distance generally equal to the cutting width when the first guide arm is in the deployed position;
positioning the first guide arm in the deployed position;
positioning the windrower to commence the first swath through a standing crop, the standing crop having an initial end, a terminal end, and a first edge extending therebetween;
aligning the observable marker with the first edge;
propelling the windrower along the first swath through the standing crop commencing at the initial end toward the terminal end while maintaining the observable marker aligned with the first edge and depositing a first windrow behind the windrower along the first swath to the terminal end to leave an area of standing crop between the first swath and the first edge having a width generally equal to the cutting width;
reversing the direction of travel of the windrower by 180 degrees;
aligning the header with the standing crop material left standing between the first edge and a closest edge of the first swath;
engaging the merger apparatus to direct the severed crop material toward the first windrow; and
propelling the windrower along a second swath commencing at the terminal end and ending at the initial end to sever the standing crop in the second swath and to direct the severed crop of the second windrow onto the first windrow.

11. The method of claim 10, further comprising the steps of:
reversing the direction of travel of the windrower by 180 degrees;
aligning the header with the standing crop material left standing opposite of the first and second swaths; and
propelling the windrower along a third swath commencing at the initial end and ending at the terminal end to sever the standing crop in the third swath and direct the severed crop of the third windrow onto the first and second windrows.

12. The method of claim 11, further comprising the steps of:
providing at least one input switch for causing the actuator to move the first guide arm between the deployed and the stowed positions; and
actuating said at least one input switch to cause the first guide arm to move from the deployed position to the stowed position at upon completion of the first swath.

13. The method of claim 10, further comprising the steps of:
providing a second guide arm mechanism mirroring the first guide arm mechanism and connected to the header for extension away from the second side wall and said header when in said deployed position;
reversing the direction of travel of the windrower by 180 degrees;
positioning the windrower to commence a fourth swath through the standing crop using a second edge of standing crop created by the third swath as a reference;
dis-engaging the merger apparatus to enable the severed crop material to be deposited behind the windrower; and
propelling the windrower along a fourth swath through the standing crop commencing at the terminal end toward the initial end while maintaining the second observable marker aligned with the second edge and depositing a fourth windrow behind the windrower along the fourth swath.

14. A method for guiding an agricultural windrower along a first swath through a field of standing crop using a multiple windrow merging operation comprising the steps:
providing a windrower with a forwardly disposed header for severing a standing crop from a field and depositing the severed crop on the ground in a windrow, the header having generally opposing first and second side walls and a cutter mechanism disposed therebetween, the cutter mechanism having a cutting width bounded by opposing first and second cutting edges;
providing a merger apparatus for selectively directing the severed crop to a laterally displaced location on the ground;

providing a first guide arm mechanism comprising an elongate guide arm having a first end for connection to the header and a generally opposing remote second end;

providing a bracket for connecting the first end to the header adjacent to the first side wall, the bracket configured to allow movement of the first guide arm between a stowed position and a deployed position, the first guide arm disposed between the first and second side walls when in the stowed position and extending laterally away from the first side wall and the header when in the deployed position;

providing an observable marker connected to the second end, the marker being displaced from the first cutting edge a distance generally equal to the cutting width when the first guide arm is in the deployed position;

aligning the observable marker with the first edge;

engaging the merger apparatus to direct the severed crop material laterally to a first windrow;

propelling the windrower along the first swath through the standing crop commencing at the initial end toward the terminal end while maintaining the observable marker aligned with the first edge to leave an area of standing crop between the first swath and the first edge having a width generally equal to the cutting width and depositing the first windrow laterally displaced from the windrower along the first swath to the terminal end;

reversing the direction of travel of the windrower by 180 degrees;

aligning the header with the standing crop material left standing between the first edge and a closest edge of the first swath; and propelling the windrower along a second swath commencing at the terminal end and ending at the initial end to sever the standing crop in the second swath and to direct the severed crop of the second windrow onto the first windrow.

15. The method of claim 14, further comprising the steps of:

providing at least one input switch for causing the actuator to move the first guide arm between the deployed and the stowed positions; and actuating said at least one input switch to cause the first guide arm to move from the deployed position to the stowed position at upon completion of the first swath.

16. The method of claim 15, further comprising the steps of:

providing an adjustable discharge for the merger whereby the lateral displacement of the windrow from the windrower may be selectively varied between a short throw and a long throw;

selecting the short throw for the merger apparatus;

propelling the windrower along a first swath through the standing crop commencing at the initial end toward the terminal end while maintaining the observable marker aligned with the first edge to leave an area of standing crop between the first swath and the first edge having a width generally equal to the cutting width and depositing a first windrow laterally displaced from the windrower along the first swath to the terminal end;

reversing the direction of travel of the windrower by 180 degrees;

aligning the header with standing crop material on the side opposite of the crop left standing between the first edge and a closest edge of the first swath;

propelling the windrower along a second swath commencing at the terminal end and ending at the initial end to sever the standing crop in the second swath and to direct the severed crop of the second windrow onto the first windrow;

reversing the direction of travel of the windrower by 180 degrees;

aligning the header with the area of standing crop between the first swath and the first edge;

selecting the long throw for the merger apparatus;

propelling the windrower along a third swath commencing at the initial end and ending at the terminal end to sever the standing crop in the third swath and direct the severed crop of the third windrow onto the first and second windrows;

reversing the direction of travel of the windrower by 180 degrees;

aligning the header with standing crop material on the side opposite of the second swath; and propelling the windrower along a fourth swath commencing at the terminal end and ending at the initial end to sever the standing crop in the fourth swath and to direct the severed crop of the fourth windrow onto the first windrow.

\* \* \* \* \*